(12) United States Patent
Durocher et al.

(10) Patent No.: US 12,510,041 B1
(45) Date of Patent: Dec. 30, 2025

(54) GAS TURBINE ENGINE NOZZLE WITH VARIABLE AREA

(71) Applicant: Pratt & Whitney Canada Corp., Québec (CA)

(72) Inventors: Eric S. Durocher, Québec (CA); Michel Labrecque, Québec (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/805,687

(22) Filed: Aug. 15, 2024

(51) Int. Cl.
*F02K 1/11* (2006.01)
*F02K 1/12* (2006.01)

(52) U.S. Cl.
CPC .............. *F02K 1/11* (2013.01); *F02K 1/12* (2013.01); *F05D 2220/323* (2013.01)

(58) Field of Classification Search
CPC . F02K 1/11; F02K 1/12; F02K 1/1207; F02K 1/06
See application file for complete search history.

(56) References Cited

U.S. PATENT DOCUMENTS

| | | | | |
|---|---|---|---|---|
| 2,669,834 A * | 2/1954 | Helms, Jr. | ................. | F02K 1/06 239/265.39 |
| 2,936,578 A * | 5/1960 | Chamberlain | ............ | F02K 1/06 74/105 |
| 3,024,599 A * | 3/1962 | Keen | ...................... | F02K 1/1207 239/265.37 |
| 3,373,940 A * | 3/1968 | Loprete | ..................... | F02K 1/06 239/265.15 |
| 3,786,993 A | 1/1974 | Burgess et al. | | |
| 4,274,610 A | 6/1981 | Bastian | | |
| 5,806,791 A | 9/1998 | Hatalsky et al. | | |
| 5,956,939 A * | 9/1999 | Fage | ....................... | F02K 1/386 239/265.29 |
| 11,879,416 B1 | 1/2024 | Napier et al. | | |
| 2022/0290617 A1* | 9/2022 | Marlin | .................. | F16C 19/505 |

* cited by examiner

*Primary Examiner* — Andrew H Nguyen
(74) *Attorney, Agent, or Firm* — CANTOR COLBURN LLP

(57) ABSTRACT

An aircraft gas turbine engine includes an exhaust nozzle having a nozzle flowpath, and a nacelle of the gas turbine engine at least partially defining an exhaust nozzle flow area of the exhaust nozzle. The nacelle extends axially along an engine central longitudinal axis of the gas turbine engine and circumferentially around the engine central longitudinal axis. A shutter vector apparatus is attached to the nacelle and is operable between a stowed position and a deployed position. The shutter vector apparatus is configured to modulate the exhaust nozzle flow area when the shutter vector apparatus is moved between the stowed position and the deployed position. The shutter vector apparatus includes a plurality of shutter elements, each shutter element having at least one aerodynamic surface extending into the nozzle flowpath of the exhaust nozzle when the shutter vector apparatus is in the deployed position.

18 Claims, 3 Drawing Sheets

GAS TURBINE ENGINE NOZZLE WITH VARIABLE AREA

BACKGROUND

Exemplary embodiments pertain to the art of gas turbine engines, and in particular to exit nozzles of gas turbine engines.

Engine and nacelle configurations for civilian aircraft applications typically do not have a variable exit nozzle area control for performance optimization, often for economic reasons. Establishing a variable exit nozzle configuration for such applications, however, would allow for improving aircraft and engine performance during flight operations. Some prior variable nozzle area configurations utilize a shutter vector system. Such systems may be suitable for some applications; however, they can in some instances disadvantageously disturb nozzle airflow.

BRIEF DESCRIPTION

In one exemplary embodiment, an aircraft gas turbine engine includes an exhaust nozzle having a nozzle flowpath, and a nacelle of the gas turbine engine at least partially defining an exhaust nozzle flow area of the exhaust nozzle. The nacelle extends axially along an engine central longitudinal axis of the gas turbine engine and circumferentially around the engine central longitudinal axis. A shutter vector apparatus is attached to the nacelle and is operable between a stowed position and a deployed position. The shutter vector apparatus is configured to modulate the exhaust nozzle flow area when the shutter vector apparatus is moved between the stowed position and the deployed position. The shutter vector apparatus includes a plurality of shutter elements, each shutter element having at least one aerodynamic surface extending into the nozzle flowpath of the exhaust nozzle when the shutter vector apparatus is in the deployed position.

Additionally or alternatively, in this or other embodiments an aerodynamic surface of the at least one aerodynamic surface includes a curvilinear profile in at least one of an axial direction and a circumferential direction.

Additionally or alternatively, in this or other embodiments each shutter element includes an element base, and an element arm extending axially forward from the element base. The at least one aerodynamic surface extends from the element base radially outwardly and axially forward toward the element arm.

Additionally or alternatively, in this or other embodiments a nacelle recess is formed in the nacelle in which the shutter vector apparatus is at least partially located.

Additionally or alternatively, in this or other embodiments the shutter vector apparatus includes a housing to which the plurality of shutter elements are movably secured, and a plurality of actuator arms. Each actuator arm of the plurality of actuator arms is pivotably connected to a respective shutter element of the plurality of shutter elements. The plurality of actuator arms are configured to urge movement of the plurality of shutter elements between the stowed position and the deployed position.

Additionally or alternatively, in this or other embodiments an actuation ring is operably connected to the plurality of actuator arms and is structured to synchronize movement of the plurality of actuator arms.

Additionally or alternatively, in this or other embodiments an actuator is operably connected to the actuation ring and is configured to circumferentially move the actuation ring about the engine central longitudinal axis.

Additionally or alternatively, in this or other embodiments the plurality of actuator arms are positioned radially outward of the housing.

In another exemplary embodiment, a gas turbine engine includes a turbine section rotatable about an engine central longitudinal axis, and an exhaust nozzle positioned fluidly downstream of the turbine section, the exhaust nozzle having an exhaust nozzle flowpath. A nacelle at least partially encloses the turbine section and defines an exhaust nozzle flow area of the exhaust nozzle. The nacelle extends axially along the engine central longitudinal axis of the gas turbine engine and circumferentially around the engine central longitudinal axis. A shutter vector apparatus is attached to the nacelle and is operable between a stowed position and a deployed position. The shutter vector apparatus is configured to modulate the exhaust nozzle flow area when the shutter vector apparatus is moved between the stowed position and the deployed position. The shutter vector apparatus includes a plurality of shutter elements. Each shutter element has at least one aerodynamic surface extending into the nozzle flowpath of the exhaust nozzle when the shutter vector apparatus is in the deployed position.

Additionally or alternatively, in this or other embodiments an aerodynamic surface of the at least one aerodynamic surface includes a curvilinear profile in at least one of an axial direction and a circumferential direction.

Additionally or alternatively, in this or other embodiments each shutter element includes an element base and an element arm extending axially forward from the element base. The at least one aerodynamic surface extends from the element base radially outwardly and axially forward toward the element arm.

Additionally or alternatively, in this or other embodiments a nacelle recess is formed in the nacelle in which the shutter vector apparatus is at least partially located.

Additionally or alternatively, in this or other embodiments the shutter vector apparatus includes a housing to which the plurality of shutter elements are movably secured, and a plurality of actuator arms. Each actuator arm of the plurality of actuator arms is pivotably connected to a respective shutter element of the plurality of shutter elements. The plurality of actuator arms are configured to urge movement of the plurality of shutter elements between the stowed position and the deployed position.

Additionally or alternatively, in this or other embodiments an actuation ring is operably connected to the plurality of actuator arms and is structured to synchronize movement of the plurality of actuator arms.

Additionally or alternatively, in this or other embodiments an actuator is operably connected to the actuation ring and is configured to circumferentially move the actuation ring about the engine central longitudinal axis.

Additionally or alternatively, in this or other embodiments the plurality of actuator arms are positioned radially outboard of the housing.

In yet another exemplary embodiment, a method of operating a gas turbine engine includes urging combustion products through a turbine section of the gas turbine engine to drive rotation of the turbine section about an engine central longitudinal axis of the gas turbine engine, and directing the combustion products from the turbine section through an exhaust nozzle. A cross-sectional area of the exhaust nozzle is modulated via operation of a shutter vector apparatus positioned at the exhaust nozzle. The shutter vector apparatus includes a plurality of shutter elements.

Each shutter element has at least one aerodynamic surface extending into a nozzle flowpath of the exhaust nozzle when the shutter vector apparatus is in a deployed position.

Additionally or alternatively, in this or other embodiments the plurality of shutter elements are urged radially inwardly into the nozzle flowpath.

Additionally or alternatively, in this or other embodiments an actuator ring operably connected to the plurality of shutter elements is urged circumferentially around the engine central longitudinal axis to move the plurality of shutter elements toward the deployed position.

Additionally or alternatively, in this or other embodiments the at least one aerodynamic surface includes a curvilinear profile in at least one of an axial direction and a circumferential direction.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
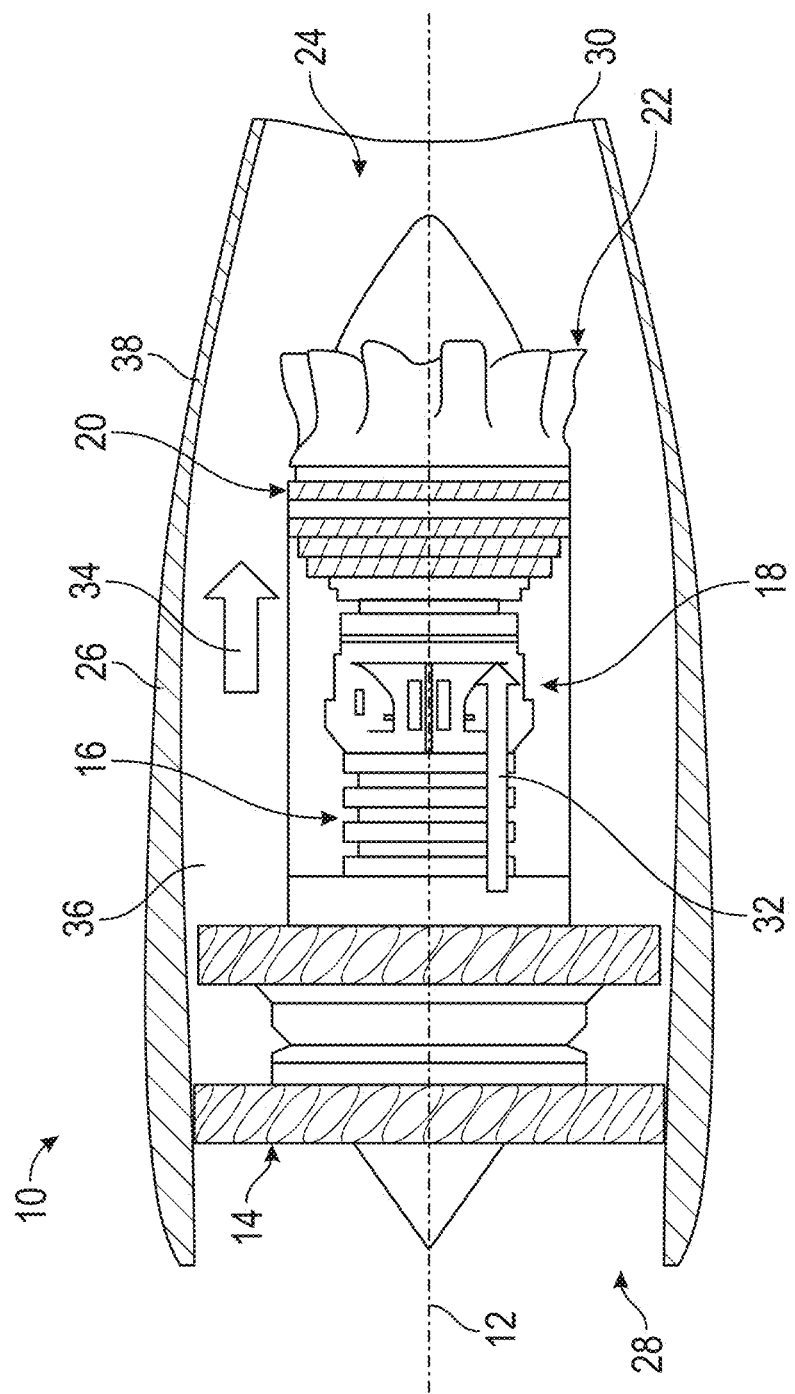
FIG. 1 is a cross-sectional illustration of an embodiment of a gas turbine engine.

Shown in FIG. 1 is an embodiment of a gas turbine engine 10. The gas turbine engine 10 includes, arranged along an engine central longitudinal axis 12, a fan section 14, a compressor section 16, a combustor section 18, a turbine section 20, a mixer 22 and a tail cone 24. The gas turbine engine 10 is at least partially disposed in a nacelle 26, which at least partially defines an engine inlet 28 at a first end of the nacelle 26, and an engine outlet or exhaust nozzle 30 at a second end of the nacelle 26 opposite the first end. In operation, a core airflow 32 is directed into the engine inlet 28, compressed at the compressor section 16, and mixed with a flow of fuel and combusted at the combustor section 18. The combustion products drive rotation of the turbine section 20 and are directed through the mixer 22 and out of the exhaust nozzle 30. A bypass airflow 34 enters the engine inlet 28 and is directed along a bypass flowpath 36 defined at least in part by an internal nacelle surface 38 of the nacelle 26. The bypass airflow 34 is also flowed out of the exhaust nozzle 30 via the mixer 22. In some embodiments, the gas turbine engine 10 is a single-spool configuration, while in other embodiments the gas turbine engine 10 may be a two or three spool configuration.

Figure 2:
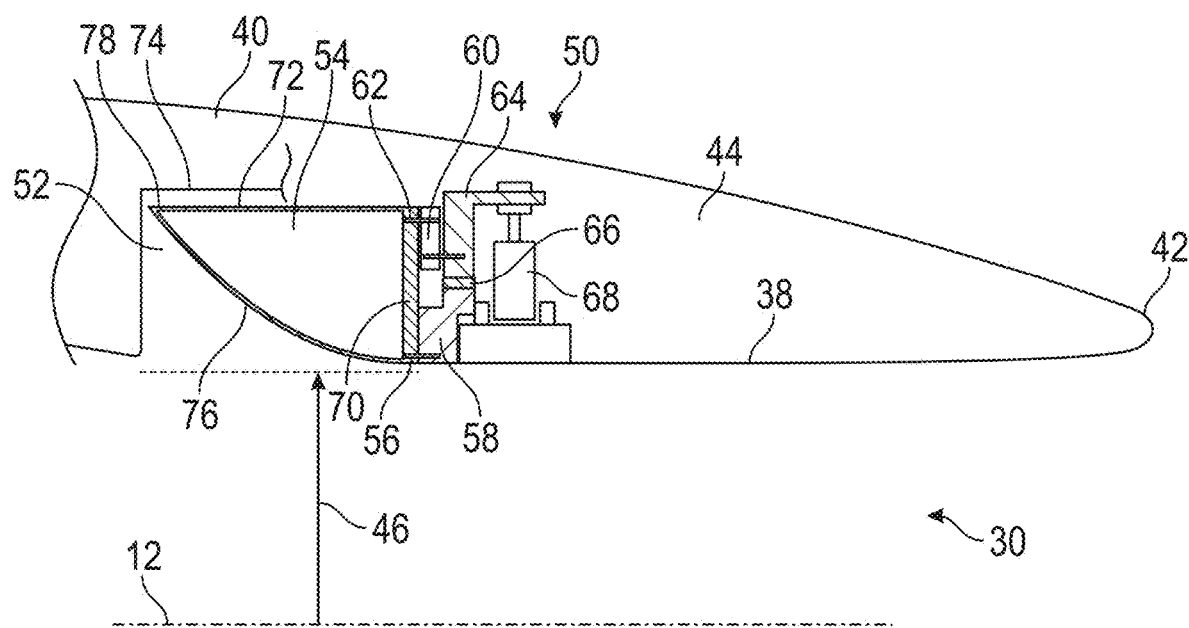
FIG. 2 is a partial cross-sectional view of an embodiment of a nozzle having a shutter vector apparatus in a stowed position.

Referring now to FIG. 2, illustrated is a partial cross-sectional view of an embodiment of a exhaust nozzle 30 of the gas turbine engine 10. The exhaust nozzle 30 includes the internal nacelle surface 38 and an outer nacelle surface 40 that converge at a nacelle tip 42, defining a nacelle body 44 therebetween. A nozzle effective radius 46, which defines an exhaust nozzle flow area, as illustrated in FIG. 2, between the engine central longitudinal axis 12 and the internal nozzle surface 40. In certain operating conditions of the gas turbine engine 10, it is desired to modify the exhaust nozzle flow area by changing the nozzle effective radius 46 during operation of the gas turbine engine 10 to enhance performance of the gas turbine engine 10 and/or the aircraft into which it is installed. To achieve this change in nozzle effective radius 46, a shutter vector apparatus 50 is disposed at the exhaust nozzle 30, in some embodiments in a nozzle recess 52 defined in the internal nacelle surface 38.

Figure 4:
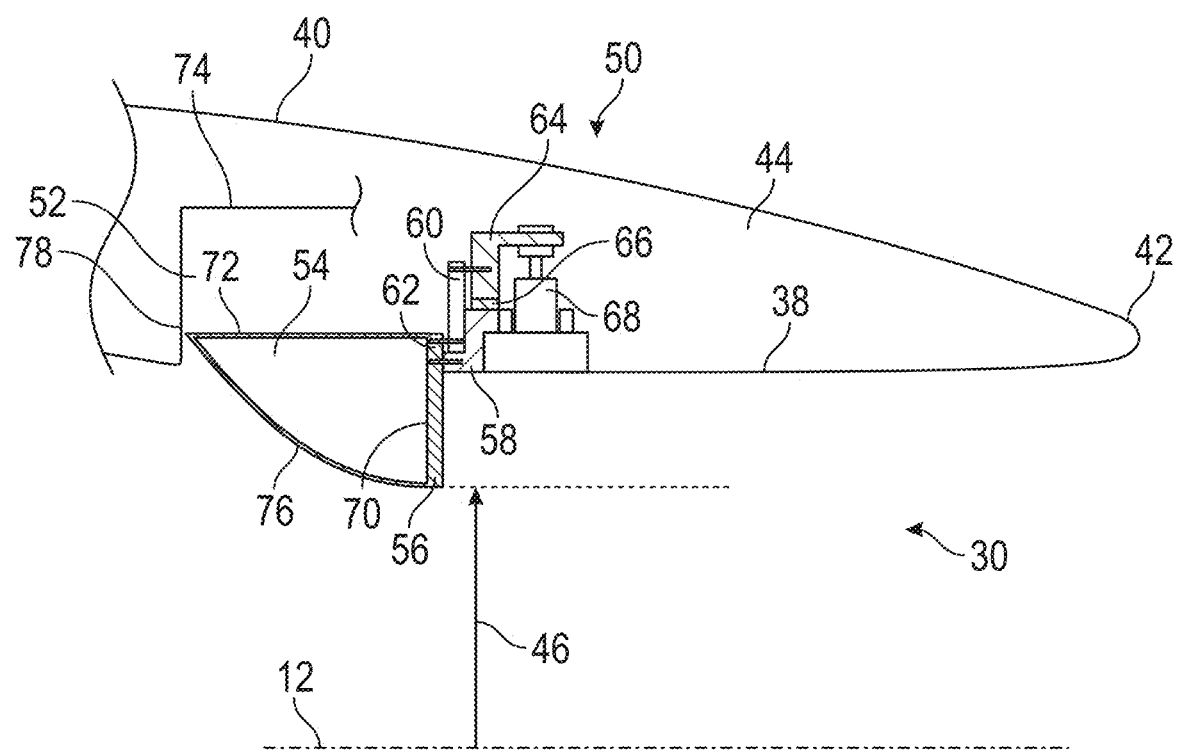
FIG. 4 is a partial cross-sectional view of an embodiment of a nozzle having a shutter vector apparatus in a deployed position.

In FIG. 2, the shutter vector apparatus 50 is illustrated in a stowed position, while in FIG. 4, the shutter vector apparatus 50 is illustrated in a deployed position. The apparatus 50 includes a plurality of shutter elements 54 pivotably secured at a first end 56 to a shutter housing 58, which is fixed relative to the engine central longitudinal axis 12. The shutter elements 54 are each secured to a movable actuator arm 60 at second end 62 of the shutter element 54. In some embodiments the shutter housing 58 is located radially inboard of the actuator arms 60. Each of the actuator arms 60 are further connected to an actuator ring 64 to urge movement of the shutter elements 54 between the stowed position of FIG. 2 and the deployed position of FIG. 4. The actuator ring 64 controls and synchronizes movement of the shutter elements 54. In some embodiments, the actuator ring 64 is supported by a bearing 66 disposed radially between the shutter housing 58 and the actuator ring 64. The actuator ring 64 is operably connected to an actuator 68 that selectably urges the actuator ring 64 to rotate about the engine central longitudinal axis 12. This rotation of the actuator ring 64 moves the shutter elements 54 between the radially outwardly stowed position and the radially inboard deployed position. This selectably increases and decreases the nozzle effective radius 46 thereby changing the exhaust nozzle flow area.

An exemplary embodiment of a shutter element 54 is illustrated in FIG. 2. The shutter element 54 includes a radially-extending element base 70 and an axially-extending element arm 72 extending perpendicularly from the element base 70, with the element arm 72 extending axially forward from the element base 70. The shutter element 54 is connected to each of the shutter housing 58 and the actuator arm 60 at the element base 70. In some embodiments, the element base 70 is flat and planar and in some embodiments, the element arm 72 is profiled in a circumferential direction to match a profile of an inner recess surface 74 of the nozzle recess 52. One or more element body surfaces 76 connect the element base 70 and the element arm 72, extending axially forward from the element base 70 toward a forward arm end 78 of the element arm 72, and extending radially outwardly from the element base 70 toward the element arm 72.

Figure 3:
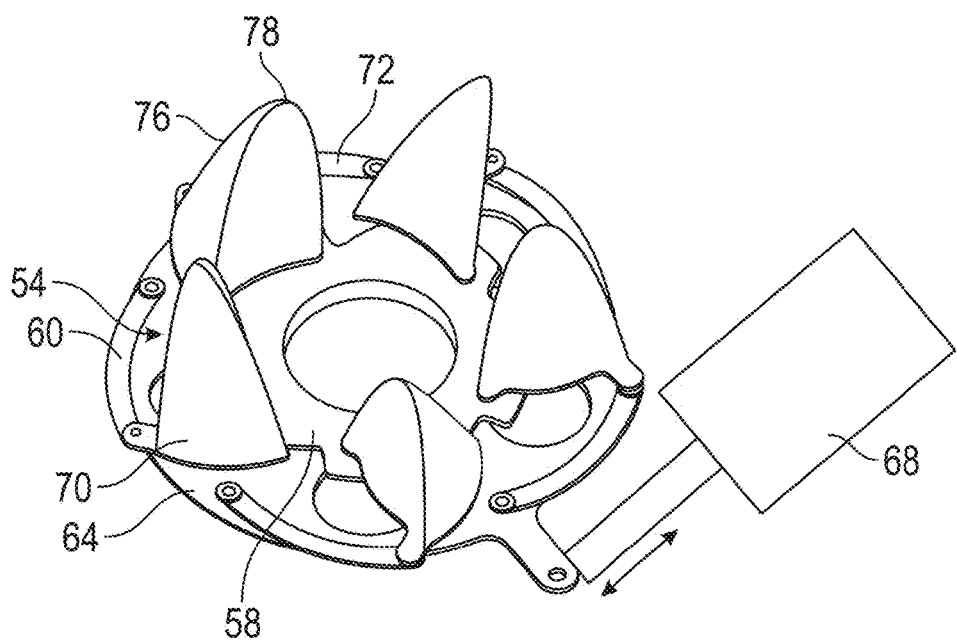
FIG. 3 is a perspective view of an embodiment of a shutter vector apparatus of a nozzle.

In some embodiments the element body surfaces 76 have a curvilinear profile in at least the axial direction as shown in FIG. 2 and in some embodiments in both the axial direction and the circumferential direction, as shown in FIG. 3. The one or more element body surfaces 76 define a three-dimensional shape that, when the shutter elements 54 are moved into the deployed position as shown in FIG. 4, define a flowpath surface in the exhaust nozzle 30 that reduces the nozzle effective radius 46 thereby reducing the exhaust nozzle flow area, compared to when the shutter elements 54 are in the stowed position. Due to the three-dimensional shape of the element body surfaces 76, this reduction in exhaust nozzle flow area is achieved while not greatly increasing disturbances or turbulence in the airflow through the exhaust nozzle 30.

In some embodiment, as illustrated in FIG. 3, the apparatus 50 includes five shutter elements 54 arranged around the engine central longitudinal axis 12. While five shutter elements 54 are illustrated in FIG. 3, one skilled in the art will readily appreciate that other quantities of shutter elements, such as 4, 6, 7 or more shutter elements 54 may be utilized in other embodiments. In the embodiment of FIG. 3, the shutter elements 54 are equispaced about the engine central longitudinal axis 12, but in other embodiments the circumferential spacing between adjacent shutter elements 54 may be varied to provide a selected exhaust nozzle flow area and position. Additionally, while the illustrated shutter elements 54 are identical in shape and size, in other embodiments one or more of shape and size of individual shutter elements 54 may be varied to provide the selected exhaust nozzle flow area and position.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft gas turbine engine, comprising:
   an exhaust nozzle having a nozzle flowpath;
   a nacelle of the gas turbine engine at least partially defining an exhaust nozzle flow area of the exhaust nozzle, the nacelle extending axially along an engine central longitudinal axis of the gas turbine engine and circumferentially around the engine central longitudinal axis; and
   a shutter vector apparatus disposed at the exhaust nozzle operable between a stowed position and a deployed position,
   the shutter vector apparatus modulating the exhaust nozzle flow area when the shutter vector apparatus is moved between the stowed position and the deployed position,
   the shutter vector apparatus including a plurality of shutter elements, each shutter element having at least one aerodynamic surface extending into the nozzle flowpath of the exhaust nozzle when the shutter vector apparatus is in the deployed position;
   wherein each shutter element includes:
      an element base; and
      an element arm extending axially forward from the element base;
      wherein the at least one aerodynamic surface extends from the element base radially outwardly and axially forward toward the element arm;
   wherein each shutter element is operably connected to an actuation apparatus configured to move the plurality of shutter elements between the stowed position and the deployed position and wherein each shutter element is configured to pivot about a pivot axis substantially parallel to the engine central longitudinal axis; and
   wherein in the stowed position the element arm is disposed radially outboard of the at least one aerodynamic surface; and
   wherein in the deployed position the element arm is disposed radially outboard of the at least one aerodynamic surface.

2. The aircraft gas turbine engine of claim 1, wherein an aerodynamic surface of the at least one aerodynamic surface includes a curvilinear profile in at least one of an axial direction and a circumferential direction.

3. The aircraft gas turbine engine of claim 1, further comprising a nacelle recess formed in the nacelle in which the shutter vector apparatus is at least partially disposed.

4. The aircraft gas turbine engine of claim 1, wherein the shutter vector apparatus includes:
   a housing to which the plurality of shutter elements are movably secured; and
   wherein the actuation apparatus includes:
      a plurality of actuator arms, each actuator arm of the plurality of actuator arms pivotably connected to a respective shutter element of the plurality of shutter elements, the plurality of actuator arms configured to urge movement of the plurality of shutter elements between the stowed position and the deployed position.

5. The aircraft gas turbine engine of claim 4, further comprising an actuation ring operably connected to the plurality of actuator arms structured to synchronize movement of the plurality of actuator arms.

6. The aircraft gas turbine engine of claim 5, further comprising an actuator operably connected to the actuation ring configured to circumferentially move the actuation ring about the engine central longitudinal axis.

7. The aircraft gas turbine engine of claim 4, wherein the plurality of actuator arms are disposed radially outward of the housing.

8. A gas turbine engine comprising:
   a turbine section rotatable about an engine central longitudinal axis; and
   an exhaust nozzle disposed fluidly downstream of the turbine section, the exhaust nozzle having an exhaust nozzle flowpath;
   a nacelle at least partially enclosing the turbine section and defining an exhaust nozzle flow area of the exhaust nozzle, the nacelle extending axially along the engine central longitudinal axis of the gas turbine engine and circumferentially around the engine central longitudinal axis; and
   a shutter vector apparatus attached to the nacelle and operable between a stowed position and a deployed position, the shutter vector apparatus configured to modulate the exhaust nozzle flow area when the shutter vector apparatus is moved between the stowed position and the deployed position, the shutter vector apparatus including a plurality of shutter elements, each shutter element having at least one aerodynamic surface extending into the nozzle flowpath of the exhaust nozzle when the shutter vector apparatus is in the deployed position;

wherein each shutter element includes:
an element base; and
an element arm extending axially forward from the element base;
wherein the at least one aerodynamic surface extends from the element base radially outwardly and axially forward toward the element arm;
wherein each shutter element is operably connected to an actuation apparatus configured to move the plurality of shutter elements between the stowed position and the deployed position and wherein each shutter element is configured to pivot about a pivot axis substantially parallel to the engine central longitudinal axis; and
wherein in the stowed position the element arm is disposed radially outboard of the at least one aerodynamic surface; and
wherein in the deployed position the element arm is disposed radially outboard of the at least one aerodynamic surface.

9. The gas turbine engine of claim 8, wherein an aerodynamic surface of the at least one aerodynamic surface includes a curvilinear profile in at least one of an axial direction and a circumferential direction.

10. The gas turbine engine of claim 8, further comprising a nacelle recess formed in the nacelle in which the shutter vector apparatus is at least partially disposed.

11. The gas turbine engine of claim 8, wherein the shutter vector apparatus includes:
a housing to which the plurality of shutter elements are movably secured; and
wherein the actuation apparatus includes:
a plurality of actuator arms, each actuator arm of the plurality of actuator arms pivotably connected to a respective shutter element of the plurality of shutter elements, the plurality of actuator arms configured to urge movement of the plurality of shutter elements between the stowed position and the deployed position.

12. The gas turbine engine of claim 11, further comprising an actuation ring operably connected to the plurality of actuator arms structured to synchronize movement of the plurality of actuator arms.

13. The gas turbine engine of claim 12, further comprising an actuator operably connected to the actuation ring configured to circumferentially move the actuation ring about the engine central longitudinal axis.

14. The gas turbine engine of claim 11, wherein the plurality of actuator arms are disposed radially outboard of the housing.

15. A method of operating a gas turbine engine, comprising:
urging combustion products through a turbine section of the gas turbine engine to drive rotation of the turbine section about an engine central longitudinal axis of the gas turbine engine;
directing the combustion products from the turbine section through an exhaust nozzle; and
modulating an exhaust nozzle flow area via operation of a shutter vector apparatus disposed at the exhaust nozzle, the shutter vector apparatus including a plurality of shutter elements, each shutter element having at least one aerodynamic surface extending into a nozzle flowpath of the exhaust nozzle when the shutter vector apparatus is in a deployed position;
wherein each shutter element includes:
an element base; and
an element arm extending axially forward from the element base;
wherein the at least one aerodynamic surface extends from the element base radially outwardly and axially forward toward the element arm;
wherein each shutter element is operably connected to an actuation apparatus configured to move the plurality of shutter elements between a stowed position and the deployed position and wherein each shutter element is configured to pivot about a pivot axis substantially parallel to the engine central longitudinal axis; and
wherein in the stowed position the element arm is disposed radially outboard of the at least one aerodynamic surface; and
wherein in the deployed position the element arm is disposed radially outboard of the at least one aerodynamic surface.

16. The method of claim 15, further comprising urging the plurality of shutter elements radially inwardly into the nozzle flowpath.

17. The method of claim 15, further comprising urging an actuator ring of the actuation apparatus operably of the actuation apparatus connected to the plurality of shutter elements circumferentially around the engine central longitudinal axis to move the plurality of shutter elements toward the deployed position.

18. The method of claim 15, wherein the at least one aerodynamic surface includes a curvilinear profile in at least one of an axial direction and a circumferential direction.

* * * * *